United States Patent [19]
Goldberg et al.

[11] Patent Number: 6,161,082
[45] Date of Patent: Dec. 12, 2000

[54] NETWORK BASED LANGUAGE TRANSLATION SYSTEM

[75] Inventors: Randy G. Goldberg, Princeton; Kenneth H. Rosen, Middletown, both of N.J.

[73] Assignee: AT&T Corp, New York, N.Y.

[21] Appl. No.: 08/972,727

[22] Filed: Nov. 18, 1997

[51] Int. Cl.[7] .......................... G06F 17/28; G06F 17/21
[52] U.S. Cl. .......................... 704/3; 704/8; 707/536; 709/204
[58] Field of Search .......................... 704/2, 3, 7, 8; 709/277, 204, 205, 206, 200, 201, 227, 228, 229; 379/88.05, 88.06, 88.22; 707/531, 532, 535, 536

[56] References Cited

U.S. PATENT DOCUMENTS

| | | | |
|---|---|---|---|
| 4,615,002 | 9/1986 | Innes | 704/8 |
| 5,029,085 | 7/1991 | Ito | 704/9 |
| 5,075,850 | 12/1991 | Asahioka et al. | 704/2 |
| 5,268,839 | 12/1993 | Kaji | 704/3 |
| 5,295,068 | 3/1994 | Nishino et al. | 704/10 |
| 5,528,491 | 6/1996 | Kuno et al. | 704/9 |
| 5,541,837 | 7/1996 | Fushimoto | 704/2 |
| 5,546,304 | 8/1996 | Marschner et al. | 704/4 |
| 5,568,383 | 10/1996 | Johnson et al. | 704/2 |
| 5,675,817 | 10/1997 | Moughanni et al. | 704/3 |
| 5,715,466 | 2/1998 | Flanagan et al. | 704/5 |
| 5,740,231 | 4/1998 | Cohn et al. | 379/88.22 |
| 5,796,395 | 8/1998 | De Hond | 345/331 |
| 5,826,219 | 10/1998 | Kutsumi | 704/4 |
| 5,841,966 | 11/1998 | Irribarren | 709/206 |
| 5,848,386 | 12/1998 | Motoyama | 704/5 |
| 5,852,798 | 12/1998 | Ikuta et al. | 704/2 |
| 5,875,422 | 2/1999 | Eslambolchi et al. | 704/3 |
| 5,884,246 | 3/1999 | Boucher et al. | 704/2 |
| 5,966,685 | 10/1999 | Flanagan et al. | 704/8 |

*Primary Examiner*—Joseph Thomas

[57] ABSTRACT

A network based language translation system is provided. A network is provided that has language translation software installed on the network. A user communication device that is interconnected to the network is utilized to communicate with the network. The user communication device both inputs text and/or spoken communications into the network and receives text and/or spoken communications from the network. The network is able to receive communication inputs from multiple users in multiple languages and translate and transmit output communications to those users in languages designated by the users.

11 Claims, 1 Drawing Sheet

NETWORK BASED LANGUAGE TRANSLATION SYSTEM

BACKGROUND OF THE INVENTION

1. Field of the Invention

The present invention relates to a language translation system. More specifically, the invention provides for a network based language translation system that is able to provide for communication between multiple users where each of the users may be utilizing a different spoken or written language.

2. Related Art

Currently, it is possible to translate text or speech communications from one language to another by utilizing a computer with translation software installed. For example, a user could enter text, in English, into a computer and have the text translated into a different language, e.g., Spanish, by a translation program and output as text in the translated language. Whereas translation of both text and speech is possible with current translation programs, because the current capability of speech recognition software is somewhat limited in its ability to recognize a wide variety of words and speech patterns, spoken language translation is only available in restricted domains where a limited variety of words are spoken. For example, if a medical doctor desires to verbally record information concerning a patient and have that verbal record recognized by speech recognition software and translated into a different language, current technology allows for this to be accomplished. Because the database of recognizable words is limited, i.e., to terms related to medical diagnoses, current software is able to recognize the words of this limited domain and translate these words to another language.

Whereas current technology allows for translation of text and some limited speech to different languages, current known methods for language translation are limited in their capabilities. Language translation is currently accomplished by utilizing stand-alone computers, such as a personal computer (PC), with language translation software installed thereon. This presents drawbacks. For example, language translation programs can be expensive and the requirement for an individual to have to purchase their own language translation software, or for a business entity to have to provide each employee's computer with language translation software if that employee requires this capability, can result in financial burdens for the individual and the business entity. Additionally, each time an upgrade to the program is required, it could be required that the upgrade program be individually purchased for each stand-alone computer, resulting in additional expenses. At the very least, the upgrade must be individually installed on each user's computer which results in additional time requirements.

Additional problems with utilizing a stand-alone computer for language translation is that of computer processing capability. To store a language translation program on a stand-alone computer, such as a personal computer, could require storage capacity that is either not available on the computer or is required for other purposes. Additionally, because relatively limited processing capability is available on a personal computer, the ability to upgrade the capabilities of the language translation programs that may be stored on the PC is limited.

An additional problem with stand-alone computer based language translation programs is their inability to support multiple users. With the increasing popularity and use of "chat sessions" on the Internet, participants in these chat sessions may be limited in their ability to communicate with other participants if the other participants speak, and thus communicate over the network, in a different language. If each participant's personal computer contains language translation software, then the parties may be able to communicate with each other, however, as addressed above, the requirement to load each user's computer with this software could be expensive. Also, because delays may occur in the conduct of the chat session due to the requirement to translate each communication received from a participant at each user's computer, the efficiency, and thus enjoyment, of the chat session can be reduced for the participants.

An additional drawback in the multi-user environment with the current language translation systems is that each of the multiple users may be communicating in a different language. Therefore, each participants' personal computer may have to translate communications from numerous different languages, which again requires more expensive software and additional processing capability.

Therefore, it would be desirable to provide a network based language translation system. The network based system could provide for both translating communications of a single user and could support multiple users, where each user is communicating in a different language. The greater processing power available in the network would allow for translation of communications in both text and speech and for accommodating increasingly capable language translation software programs.

SUMMARY OF THE INVENTION

The drawbacks in the prior art are overcome by the present invention that provides a network based language translation system. In one embodiment, a network is provided that has language translation software installed on the network. A user communication device that is interconnected to the network is utilized to communicate with the network. The user communication device both inputs text and/or spoken communications into the network and receives text and/or spoken communications from the network. The network is able to receive communication inputs from multiple users in multiple languages and translate and transmit output communications to those users in a particular language as desired by the user.

In this manner, the present invention provides for a network based language translation system that is able to support multiple users and translate communication inputs that are received in any of a wide variety of languages into communication outputs that are transmitted in any of a wide variety of languages.

DETAILED DESCRIPTION

Figure 1:
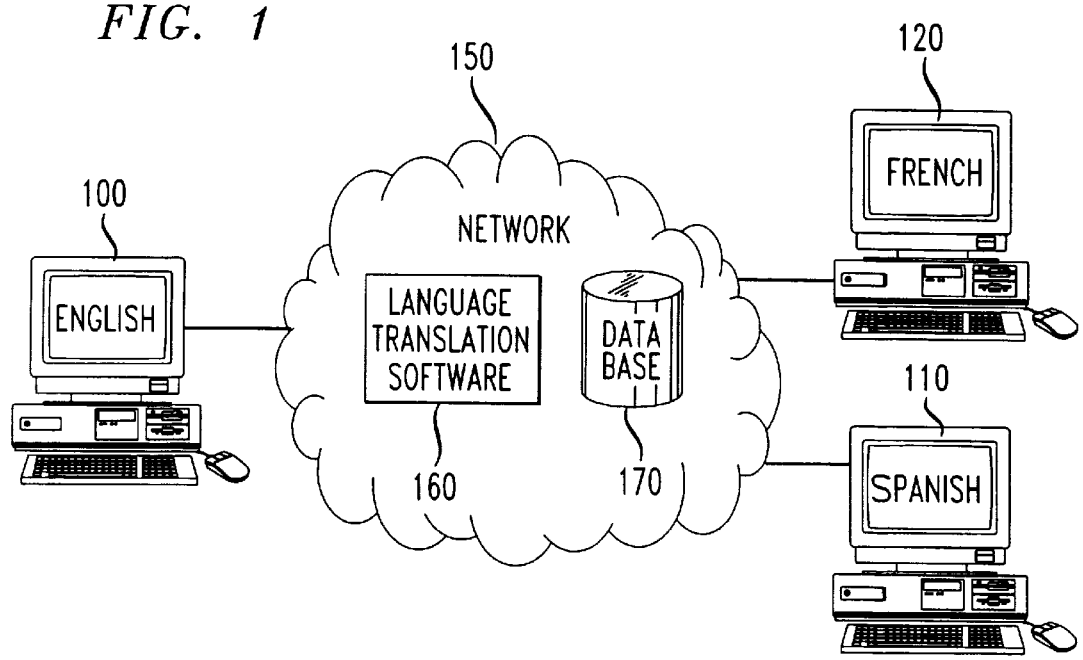
FIG. 1 illustrates an embodiment for the network based language translation system of the present invention.

FIG. 1 illustrates one embodiment for the network based language translation system of the present invention. As can be seen, multiple user communication devices 100, 110, and 120 are interconnected to network 150. Each user communication device is capable of inputting a communication to the network and receiving a communication from the network. One embodiment for user communication devices 100, 110 and 120 is a personal computer.

Network 150 is disclosed as an integrated services network, such as AT&T's "WorldNet", which provides a variety of services, one of which is interconnection to the Internet. Alternatively, network 150 may be any of a variety of different types of networks, including a telecommunications network and a data network.

Network 150 provides interconnection between each of the user communication devices 100, 110, 120 such that a user at communication device 100 is able to communicate with users at communication devices 110 and 120. Similarly, each other user at each other communication device is able to communicate with every other user that is connected to the network. Whereas three user communication devices, and thus users, are shown as interconnected to network 150 in FIG. 1, the present invention is not limited to this number of users. The processing capability and accessibility of network 150 can be either increased or decreased, as required, in order to support the desired number of network users.

By utilizing user communication devices 100, 110, and 120, which are interconnected by network 150, the users at each of these devices are able to communicate with each other. For example, each user could send e-mail messages to each other user or each user could participate in a "chat session" that is established through network 150.

The users at communication devices 100, 110, and 120 each generate and receive communications at their respective communication devices in a language that is familiar to that particular user. Therefore, each user could be communicating in the same language as each other user or each user could be communicating in a different language. For purposes of illustration of an embodiment of the present invention, the user at device 100 is communicating in English, i.e., sending text communications and receiving text communications in the English language, the user at device 110 in Spanish, and the user at device 120 in French. Therefore, because each user is communicating in their own language at each communication device and each user's own native language is different from each other user's own native language, in order to communicate with each other user, the communications sent by each user to one or more intended recipients, i.e., other users, must be translated from the sending party's native language to the intended recipient's native language. Thus, the communications received by each intended recipient are received in their own native language even though they were transmitted by the sending party in the sending party's native language.

In order to perform the required language translations, network 150 contains language translation software 160. Upon receipt of a communication at network 150 from a sending party that is intended for a particular recipient(s), network 150 will translate the communication from the language of the sending party to the language of the intended recipient(s) and transmit the communication to the intended recipient(s) as translated.

The processing capabilities of the network are sufficient to support translation of the received communication into a wide variety of different languages. Known language translation software 160 is resident in the network for performing the language translation function. The translation may be accomplished in a variety of ways, all of which are well-known in the art. For example, machine translation software could be utilized which performs a direct word for word translation of the communication. One particular type of machine translation software that is available is that provided by EPU-USE Systems and is a product named "Lexica". Whereas the translated output of these types of translation programs is not as fluent as would be desired, because many direct word for word translations are not available for certain languages and because sentence structures that incorporate these directly translated words may not be grammatically correct in the translated language, these types of programs are available and can be utilized when practicing the present invention.

A second type of known language translation program that can be utilized with the present invention is a program that translates sentences rather than each word. These programs are generally referred to as Translation Memory programs and utilize a database of previously translated sentences in order to translate a sentence from one language to another. Network database 170 can be utilized to store a library of translated sentences. These types of translation systems generally produce more grammatically correct translated sentences since the system matches an input sentence to a previously translated sentence that is stored in the database. These types of Translation Memory systems are available from MCB Systems, as well as from other sources.

The present invention is also able to be practiced by using a combination of these two known types of language translation programs as discussed above, i.e., the machine translation program which translates languages word for word and the translation memory program which translates sentences. In order to train, or further develop the database of known translated sentences that is contained in database 170, if an input sentence is not recognized as having a translated sentence stored in the database for transmission to another user, the system can translate the input communication by translating each word and transmit this translated word for word communication to the intended recipient. The recipient could then edit the translated sentence, to structure the sentence in a better grammatical form, and transmit this edited sentence back to the network where the network would store this translated sentence in the database for future use. Therefore, the next time a sentence with a similar subject is input to the network for translation, the network will access the database to retrieve this translated sentence and transmit this translated sentence to the intended recipient rather than having to translate the input communication word for word, as was previously required.

A third methodology for language translation that can be incorporated in the present invention, in addition to the methods of directly translating input words and/or sentences from one language to another language, is translating input words and/or sentences from one language to another language by first converting the input language into a universal language and then converting this universal language input into a desired native language output. These types of language translation programs are also known and provide particular utility in the network based language translation system of the present invention where multiple users that are communicating in different languages present a very large matrix of potential direct translation combinations. By providing an intermediate universal language for translation of one language to another, the network is only required to translate each language from and into the universal language and does not, therefore, have to have the capability to translate each language into every other language.

As discussed above, the language translation software has the capability to translate a communication into a variety of different languages. Since there are many different possible languages available for inputting communications to the network and a like number of possible languages available for receiving each communication, each intended recipient (s) for a particular communication, or each sender, can communicate to the network their requirements for the language format of the communication. For example, if the user at communications device 100 is connected into a chat session with the users at communication devices 110 and 120, and the user at device 100 transmits a communication in English that is intended for both the user at device 110 and device 120, the user at device 110 would desire to receive the communication in Spanish and the user at device 120 would desire to receive the communication in French. Therefore, network 150 must know or determine the language format required for each communication.

Each communication that is transmitted via network 150 to an intended recipient is addressed for that intended recipient by utilizing known methods. For example, if each user is connected to a chat session, each communication will be transmitted to each registered participant in the chat session. If a particular communication is an electronic mail (e-mail) document, the communication is designated for a particular recipient by providing the e-mail address for the intended recipient. Therefore, through known addressing methodologies, the network knows the identity of each intended recipient for each communication.

In order to determine the language format requirement for each intended recipient, network 150 stores information for each potential intended recipient in database 170 for the desired language format for each communication intended for that particular recipient. If a particular recipient desires to receive all communications in a particular language format, the recipient will provide this information to the network and the network will store this language format preference information in database 170.

The recipient can provide their language format requirements to network 150 in a variety of ways and the present invention is not limited to any particular way of communicating this information. For example, when subscribing to this network-based service, the subscriber could be asked to provide their preference for language format when receiving communications. Alternatively, the desired format can be provided to the network by the intended recipient(s) when the network notifies the intended recipient(s) of the receipt of a communication intended for the recipient(s) or by the sender when the sender sends a communication to a particular recipients(s). Where the recipient(s) designate the format upon notification of a communication for that recipient(s), the network could notify the recipient that an incoming communication has arrived and request that the recipient instruct the network as to the proper language format for the communication.

If a particular communication, or document, is not designated for transmission to another party, but rather is only intended for the drafter's own use and requires translation into a different language, the user could direct the network to translate the document into a language as designated by the user. This has particular utility where a user may be browsing documents on the Internet and wants to download and translate a document into a different language.

It will not be required that each communication that is intended for a particular recipient be translated. For example, if the network receives a communication in the English language for an intended recipient, and the network accesses database 170 and determines that the intended recipient desires that all communications be sent to the intended recipient in the English language, the network would not be required to translate the communication into a language different from that of the input communication. In this circumstance, network 150 is only required to determine the language format requirements of an intended recipient and transmit the communication to the intended recipient. No translation would be required where the input communication is determined to be in the same language as that desired by the intended recipient. If no language format requirements are designated by the intended recipient for a particular communication, the network could be configured to transmit the communication to the intended recipient in the language in which it was received or to translate the communication to a default language, e.g., English.

An additional aspect of the present invention is the ability of the sending party of a communication to designate the language of the sent communication to the network. This feature is particularly useful where the network is servicing multiple users and where each user may be sending communications to intended recipients through the network in different languages. The sending party could designate to the network the language of the input communication. This could provide efficiencies for the network in recognizing the language of the input communication.

Figure 2:
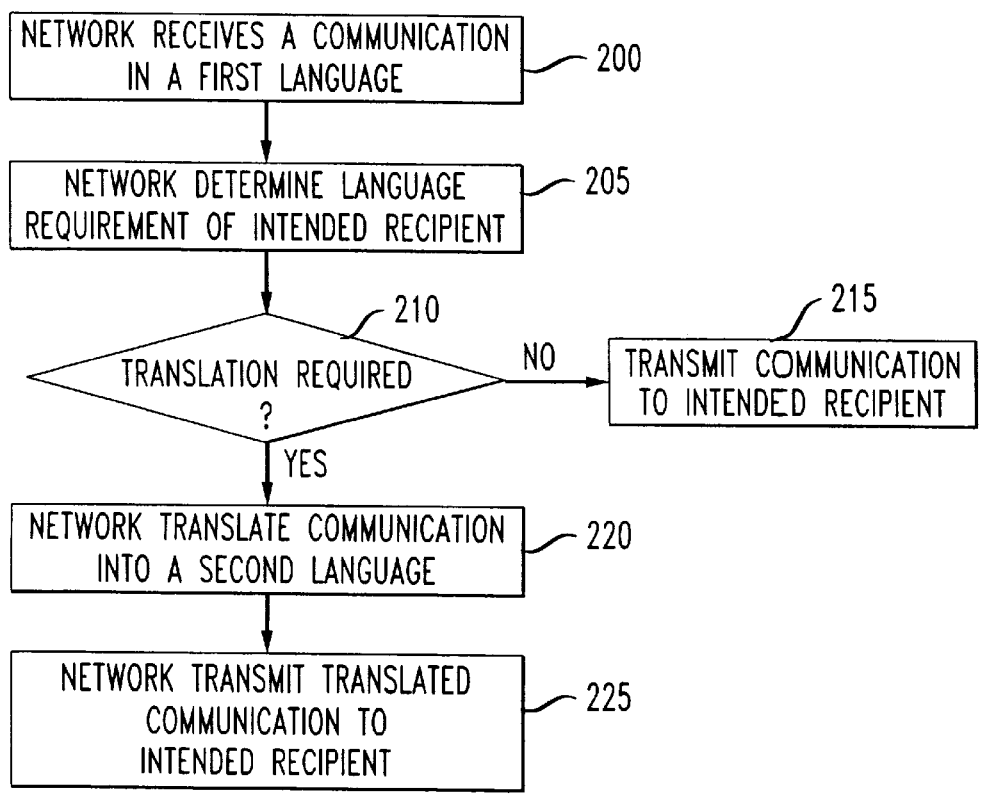
FIG. 2 illustrates a process flow chart for practicing a method in accordance with an embodiment of the present invention.

The method steps for practicing one embodiment of the present invention are illustrated in FIG. 2. As shown, step 200 is the step where the network receives a communication in a first language. In step 205, the network determines the intended recipient's desired language format for the communication. Based on the intended recipient's requirements, the network determines whether translation of the communication is required prior to transmitting the communication to the intended recipient, step 210. If no translation of the communication is required, the network will transmit the communication to the intended recipient, step 215. If the communication requires translation, the network will translate the communication into a second language, step 220. In step 225, the network transmits the translated communication to the intended recipient in the second language.

The method steps shown in FIG. 2 are not intended to be all inclusive of all of the features of the present invention, as described in this specification. The specification, when read as a whole, fully describes the network based language translation system of the present invention.

Several variations on the disclosed embodiments are contemplated. In the disclosed embodiments, the user communication device is disclosed as a personal computer and the communications are text messages. However, a personal computer is not required to be utilized for generating and receiving text messages. A telephone with a keypad and a display that is capable of displaying text could be utilized as the communication device for both the sending party and the intended recipient. Additionally, a Personal Data Assistant (PDA) with a wireless network interface could be utilized. For text to be entered in such devices where there may be no alphanumeric keys, the input keys that are provided on the devices could be utilized with each letter being represented by a designated sequence of key strokes. If no display is available, the received translated communication could be received as speech by utilizing known text-to-speech software.

The network based language translation system of the present invention is also not limited to translating text messages. The sending party could input oral communications to the network and the network could translate and transmit these oral communications to the intended recipient. The sending party could input an oral communication and the intended recipient could receive an oral communication by utilizing a microphone connected to the user's personal computer or by utilizing a telephone as the communications device. In this embodiment where an oral communication is translated, the network could utilize speech recognition software to convert the oral communication to text, translate the text to another language, as disclosed, and convert the translated text to speech for communicating the translated communication to the intended recipient as an oral communication. Alternatively, direct speech-to-speech translation programs could be utilized with the present invention. As the capabilities of these direct speech-to-speech translation programs continue to improve, the network could be upgraded to incorporate these enhanced capabilities. In the embodiment where oral communications are translated and transmitted, a telecommunications network could also be utilized to interconnect the communicating parties.

The present invention is also not limited to receiving an input communication and transmitting an output translated communication in the same medium, i.e., receiving and transmitting a text communication or receiving and transmitting an oral communication. For example, by utilizing the principles outlined above, the present invention could receive an oral communication and transmit a translated text message to the intended recipient, or vice-versa.

In this manner, a network based language translation system is provided. The network based system can support multiple users, where each user is communicating in a different language. Because each user does not have to have their own language translation software installed on their communication device, e.g., PC, efficiencies in cost for each user and the processing capabilities required for the communication device of each user, can be achieved with the present invention. The greater processing power available in the network allows for translation of communications in both text and speech and for accommodating increasingly capable language translation software programs.

The disclosed embodiments are illustrative of the various ways in which the present invention may be practiced. Other embodiments can be implemented by those skilled in the art without departing from the spirit and scope of the present invention.

What is claimed is:

1. A method for transmitting a communication comprising:

receiving a communication in a first language at a network from a sending party, the communication intended for transmission to a receiving party;

notifying the receiving party of receipt of the communication at the network by the network;

requesting the receiving party's instructions for translation of the communication into a second language by the network;

receiving the receiving party's instructions for translation of the communication at the network in response to the network's request;

translating the communication into the second language by the network in response to the received instructions from the receiving party;

transmitting the translated communication in the second language to the receiving party by the network;

receiving an instruction from the sending party for translation of said received communication at the network sent by the sending party into a third language;

translating said received communication sent by the sending party into said third language by the network in response to the received instructions from the sending party; and transmitting said translation of said received communication sent by the sending party in said third language only back to the sending party by the network.

2. The method for transmitting a communication of claim 1 wherein the network is a telecommunications network.

3. The method for transmitting a communication of claim 1 wherein the network is an integrated services network.

4. The method for transmitting a communication of claim 1 further comprising the step of identifying the first language to the network by the sending party.

5. The method for transmitting a communication of claim 1 wherein the step of translating the communication into the second language by the network in response to the received instructions from the receiving party comprises the steps of:

determining if a translated sentence in the second language is stored in a database in the network that corresponds to a sentence of the received communication at the network in the first language;

if a translated sentence in the second language is not stored in the database that corresponds to a sentence of the received communication at the network in the first language:

performing a word for word translation of the sentence of the received communication in the first language into the second language to create a translated sentence in the second language;

transmitting the translated sentence to the sending party;

receiving and editing the translated sentence by the sending party;

transmitting an edited translated sentence by the sending party to the network;

receiving the edited translated sentence at the network;

storing the edited translated sentence in the database; and transmitting the edited translated sentence to the receiving party; and if a translated sentence in the second language is stored in the database that corresponds to the sentence of the received communication at the network in the first language:

transmitting the translated sentence to the receiving party.

6. A language translation system comprising:

a network, said network including language translation software wherein said network receives a communication in a first language from a sending party intended for transmission to a receiving party and wherein said network notifies the receiving party of receipt of said communication at said network and requests instructions from the receiving party for translation of said communication into a second language and wherein said network translates said communication into said second language by said language translation software in response to a received instruction from the receiving party and transmits said communication in said second language to the receiving party and further wherein said network receives an instruction from the sending party for translation of said received communication at the network sent by the sending party into a third language and said network translates said received communication sent by the sending party into said third language by the network in response to the received instruction from the sending party and transmits said translation of said received communication sent by the sending parts in said third language only back to the sending party; and a user communication device connected to said network.

7. The language translation system of claim 6 wherein said user communication device is a personal computer.

8. The language translation system of claim 6 wherein said user communication device is a telephone.

9. The language translation system of claim 6 wherein said network is a telecommunications network.

10. The language translation system of claim 6 wherein said network is an integrated services network.

11. The language translation system of claim 6 further comprising a second user communication device connected to said network.

* * * * *

UNITED STATES PATENT AND TRADEMARK OFFICE
CERTIFICATE OF CORRECTION

PATENT NO. : 6,161,082  
DATED : December 12, 2000  
INVENTOR(S) : Goldberg et al.

Page 1 of 1

It is certified that error appears in the above-identified patent and that said Letters Patent is hereby corrected as shown below:

Column 8,  
Line 64, replace "parts" with -- party --.

Signed and Sealed this

Twentieth Day of November, 2001

Attest:

*Attesting Officer*

NICHOLAS P. GODICI  
*Acting Director of the United States Patent and Trademark Office*